(12) United States Patent
Saito (10) Patent No.: US 7,164,545 B2
(45) Date of Patent: *Jan. 16, 2007

(54) IMAGING LENS SYSTEM

(75) Inventor: Tomohiro Saito, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/250,999

(22) Filed: Oct. 14, 2005

(65) Prior Publication Data

US 2006/0087749 A1    Apr. 27, 2006

(30) Foreign Application Priority Data

Oct. 19, 2004  (JP) .............................. 2004-304079
Jul. 13, 2005  (JP) .............................. 2005-204131
Aug. 4, 2005  (JP) .............................. 2005-226266

(51) Int. Cl.
*G02B 13/18* (2006.01)
*G02B 3/02* (2006.01)
*G02B 9/06* (2006.01)

(52) U.S. Cl. ..................... 359/794; 359/717
(58) Field of Classification Search ................ 359/793, 359/794, 739, 719, 717, 691
See application file for complete search history.

(56) References Cited

U.S. PATENT DOCUMENTS 5,978,159 A    11/1999  Kamo et al.
2004/0165278 A1    8/2004  Cahall
2005/0157408 A1*    7/2005  Do et al. .................... 359/717

FOREIGN PATENT DOCUMENTS

JP    2004-170460    6/2004

* cited by examiner

*Primary Examiner*—Alicia M Harrington
(74) *Attorney, Agent, or Firm*—Koda & Androlia (57) ABSTRACT

The imaging lens system includes, from the object side, a diaphragm, a first lens as a positive meniscus lens whose convex surface faces the object side, and a second lens as a positive lens whose convex surface faces the image surface side, wherein the following expressions are to be satisfied $1.25 \geq L/fl \geq 0.8$, $0.55 \geq f_1/f_2 \leq 0.2$, $1.8 \geq f_1/fl \geq 1$, $4 \geq f_2/fl \geq 1.5$, $1 \geq d_2/d_1 \geq 0.5$, $0.27 \geq d_1/fl \geq 0.1$, $0.27 \geq d_3/fl \geq 0.1$ (where, L: entire length of the lens system, fl: focal distance of entire lens system, $f_1$: focal distance of the first lens, $f_2$: focal distance of the second lens, $d_1$: center thickness of the first lens, $d_2$: distance between the first lens and second lens on the optical axis, $d_3$: center thickness of the second lens).

8 Claims, 9 Drawing Sheets

IMAGING LENS SYSTEM

BACKGROUND OF THE INVENTION

1. Field of the Invention

The present invention relates to an imaging lens system and, particularly, to an imaging system of two-lens structure which is capable of reducing the size and weight and improving the optical performance and productivity. The imaging system is used for an image pickup device that forms images of objects such as scenery and human figures on an image taking surface of a solid image sensor element such as a CCD, CMOS, or the like, which is mounted on a portable computer, a television telephone, a cellular phone, and the like.

2. Description of the Related Art

Recently, there has been a remarkably increasing demand for a camera which utilizes a solid image sensor element such as a CCD, CMOS, or the like, which is to be mounted on a portable telephone, a portable computer, and a television telephone, for example. Such camera is necessary to be mounted on a limited mount space so that it is desired to be small and light.

Accordingly, an imaging lens system used for such camera is also required to be small and light. Thus, conventionally, a single-structure lens system using a single lens is used for such imaging lens system.

Such lens system with single-lens structure is sufficient when applied to a solid image sensor element referred to as CIF which has resolution of about 110,000 pixels. However, recently, use of a solid image sensor element referred to as VGA, which has higher resolution of about 300,000 pixels, has been investigated. In order to fully use the ability of the resolution of such solid image sensor element with the high resolution, the conventional lens system with the single-lens system is not sufficient.

Thus, conventionally, various types of lens systems with two-lens structure and three-lens structure have been proposed, which are more excellent in optical performance compared to that of the lens system with a single-lens structure.

In those cases, the three-lens-structure lens system enables to effectively correct each aberration that causes deterioration of the optical performance, thereby achieving extremely high optical performance. However, there are a large number of components required in the three-lens-structure lens system so that reduction of the size and weight is difficult, and manufacturing cost increases since high precision is required in each component.

On the contrary, the two-lens-structure lens system exhibits higher optical performance than the single-lens-structure lens system although it is not as high as that of the three-lens-structure lens system. Thus, it is considered a preferable lens system for a small and high-resolution solid image sensor element.

Conventionally, as such two-lens-structure lens system, a large number of so-called retro-focus type lens systems in which a negative lens and a positive lens are combined have been proposed. However, although such retro-focus type lens system can reduce the cost by decreasing the number of components, reduction of the size and weight close to that of the single-lens-structure lens system is practically not possible due to its structure where the back focus distance becomes long.

Further, as another two-lens-structure lens system, there is so-called a telephoto-type lens system in which a positive lens and a negative lens are combined. However, such telephoto-type lens system is originally developed for film photos so that the back focus distance is too short. Also, there is an issue of telecentricity so that it is difficult to use it as it is for an imaging lens system for a solid image sensor element.

Further, conventionally, the main stream structure of the two-lens-structure lens system or the three-lens-structure lens system has been formed to have a diaphragm disposed between two lenses which are adjacent to each other in the optical axis direction (for example, see Japanese Patent Unexamined Publication No. 2004-163850 and Japanese Patent Unexamined Publication No. 170460).

However, recently, there has been more increasing demand for still further improvement of the optical performance in this type of imaging lens system in addition to the reduction of size and weight. Thus, with the structure in which a diaphragm is disposed between two lenses as the imaging lens system disclosed in Japanese Patent Unexamined Publication No. 2004-163850 and Japanese Patent Unexamined Publication No. 170460, it is difficult to achieve both the reduction of size and weight and further improvement of the optical performance. Furthermore, it is difficult to align with the characteristic of a sensor (incident angle for the sensor).

SUMMARY OF THE INVENTION

The present invention has been designed to overcome the aforementioned problems. It is therefore an object of the present invention to provide an imaging lens system which can fully meet the demand for reduction of the size and weight and further improvement of the optical performance and also can improve the productivity.

In this specification, "productivity" is not only the productivity in the case of mass-producing the imaging lens systems (for example, moldability, cost, and the like when mass-producing the imaging lens systems by injection molding) but also includes simplicity of processing, manufacturing, and the like of equipment which is used for manufacturing the imaging lens systems (for example, simplicity and the like of processing a die which is used for the injection molding).

In order to achieve the foregoing object, an imaging lens system according to a first aspect of the present invention is an imaging lens system used for forming an image of an object on an image taking surface of a solid image sensor element. The imaging lens system comprises:

in order from an object side towards an image surface side, a diaphragm; a first lens which is a meniscus lens having positive power whose convex surface facing the object side, and a second lens which is a lens having a positive power whose convex surface facing the image surface, wherein conditions expressed by each of following expressions (1)–(7) are to be satisfied;

$$1.25 \geq L/fl \geq 0.8 \tag{1}$$

$$0.55 \geq f_1/f_2 \geq 0.2 \tag{2}$$

$$1.8 \geq f_1/fl \geq 1 \tag{3}$$

$$4 \geq f_2/fl \geq 1.5 \tag{4}$$

$$1 \geq d_2/d_1 \geq 0.5 \tag{5}$$

$$0.27 \geq d_1/fl \geq 0.1 \tag{6}$$

$$0.27 \geq d_3/fl \geq 0.1 \tag{7}$$

where, L: entire length of the lens system
  fl: focal distance of entire lens system
  $f_1$: focal distance of the first lens $f_2$: focal distance of the second lens $d_1$: center thickness of the first lens $d_2$: distance between the first lens and the second lens on the optical axis $d_3$: center thickness of the second lens In the present invention according to the first aspect, the diaphragm is disposed at a point closest to the object side. Thus, it enables to maintain high telecentricity so that the incident angle of the light rays with respect to the sensor of the solid image sensor element can be modified.

In the present invention, disposing the diaphragm at a position closest to object side does not hinder the part of the object-side surface (convex surface) of the first lens, which is near the optical axis, from being disposed at a position closer to the object side than the diaphragm through the diaphragm. Even so, physically, the diaphragm is disposed at a position closer to the object side than the first lens as a whole. Thus, it complies with what is disclosed in appended claims.

Further, in the present invention according to the first aspect, the first lens is formed as a meniscus lens having positive power whose convex surface facing the object side, the second lens is formed as a lens having a positive power, and the power of each lens is designated to satisfy the conditions expressed by each of the expressions (1)–(7). Therefore, it is possible to improve the productivity while achieving reduction of size and weight.

In the imaging lens system according to a second aspect, the second lens of the first aspect is formed as a meniscus lens.

With the present invention according to the second aspect, further, it becomes possible to improve the optical performance of the periphery without imposing a burden on the shapes of the first lens and second lens. Also, the light rays making incidence to the periphery of the solid image sensor element can be more effectively utilized.

Further, in the imaging lens system according to a third aspect, an object-side surface of the second lens of the first aspect is protruded towards the object side in the area near the optical axis and is also formed as an aspherical face with an inflection point.

With the present invention according to the third aspect, further, it enables to further improve the optical performance of the periphery by reducing a burden on the shapes of the first lens and second lens. Also, the light rays making incidence to the periphery of the solid image sensor element can be more effectively utilized.

Furthermore, in the imaging lens system according to a fourth aspect, an outer end part of effective diameter in an object-side surface of the second lens according to the third aspect is positioned closer to the object side than a point on the optical axis on the object-side surface of the second lens.

With the present invention according to the fourth aspect, the optical performance in the periphery can be more improved. Also, it is not only advantageous at the time of handling the lens but also advantageous at the time of assembling for making a unit by mounting the lens to a barrel.

Moreover, in the imaging lens system according to a fifth aspect, the diaphragm in any one of the first to fourth aspects satisfies a following expression;

$$0.2 \geq S \qquad (8)$$

where, S: distance between the diaphragm on an optical axis and an optical surface closest to the object side.

With the present invention according to the fifth aspect, further, it becomes possible to more effectively maintain the telecentricity by satisfying the expression (8). Thus, more reduction of the size and weight can be achieved.

Further, in the imaging lens system according to a sixth aspect, in any of the first to fifth aspects, condition expressed by a following expression (9) is to be further satisfied;

$$0.8 \geq Bfl/fl \geq 0.4 \qquad (9)$$

where, Bfl: back focus distance (distance from a lens end surface to an image taking surface on an optical axis (air reduced length)).

With the present invention according to the sixth aspect, reduction of the size and weight can be more effectively achieved by satisfying the expression (9). Also, the productivity can be more improved and it can be more easily handled at the time of assembling.

Furthermore, in the imaging lens system according to a seventh aspect, in any of the first to sixth aspects, condition expressed by a following expression (10) is to be further satisfied;

$$2.5 \geq Bfl \geq 1.2 \qquad (10)$$

With the present invention according to the seventh aspect, reduction of the size and weight can be more effectively achieved by satisfying the expression (10). Also, the productivity can be more improved and it can be more easily handled at the time of assembling.

Moreover, in the imaging lens system according to an eighth aspect, in any of the first to seventh aspects, condition expressed by a following expression (10) is to be further satisfied;

$$-0.5 \geq r4/fl \geq 6.0 \qquad (11)$$

where, $r_4$: curvature radius of a surface of the second lens on the image surface side.

With the present invention according to the eighth aspect, it becomes possible to perform processing of the optical surface more easily by satisfying the expression (11). Also, it enables to correct each aberration in the periphery more excellently.

With the imaging lens system according to the first aspect of the present invention, it is possible to achieve an imaging lens system which is small and light, excellent in optical performance, and also has a good productivity.

Further, with the imaging lens system according to the second aspect of the present invention, in addition to the effect of the imaging lens system of the first aspect, it is possible achieve a small-size imaging lens system which can improve the optical performance while maintaining the good productivity, and also is capable of effectively utilizing the light rays that make incidence to the periphery of the solid image sensor element.

Furthermore, with the imaging lens system according to the third aspect of the present invention, in addition to the effect of the imaging lens system of the first aspect, it is possible to exhibit more excellent optical performance while maintaining the good productivity. Also, it is possible to achieve a small-size imaging lens system which can more effectively utilize the light rays that make incident to the periphery of the solid image sensor element.

Moreover, with the imaging lens system according to the fourth aspect of the present invention, in addition to the effect of the imaging lens system of the third aspect, it is possible achieve a small-size imaging lens system which is more excellent in the optical performance while enabling to maintain the good productivity, and also is capable of effectively utilizing the light rays that make incidence to the periphery of the solid image sensor element.

Further, with the imaging lens system according to the fifth aspect of the present invention, in addition to the effect of the imaging lens system in any one of the first to fourth aspects, further, the telecentricty can be more effectively maintained. Also, it is possible to achieve an imaging les system which is suitable for further reduction of size and weight.

Furthermore, with the imaging lens system according to the sixth aspect of the present invention, in addition to the effect of the imaging lens system in any one of the first to fifth aspects, further, it is possible to achieve an imaging lens system which is more reduced in size and weight and has an excellent productivity.

Moreover, with the imaging lens system according to the seventh aspect of the present invention, in addition to the effect of the imaging lens system in any one of the first to sixth aspects, further, it is possible to achieve an imaging lens system which is still more suitable for reducing size and weight and for improving the productivity.

Further, with the imaging lens system according to the eighth aspect of the present invention, in addition to the effect of the imaging lens system in any one of the first to seventh aspects, further, it is possible to achieve an imaging lens system which is more excellent in the optical performance and the productivity.

DETAILED DESCRIPTION OF THE PREFERRED EMBODIMENTS

Embodiments of an imaging lens system according to the present invention will be described hereinafter by referring to FIG. 1.

Figure 1:
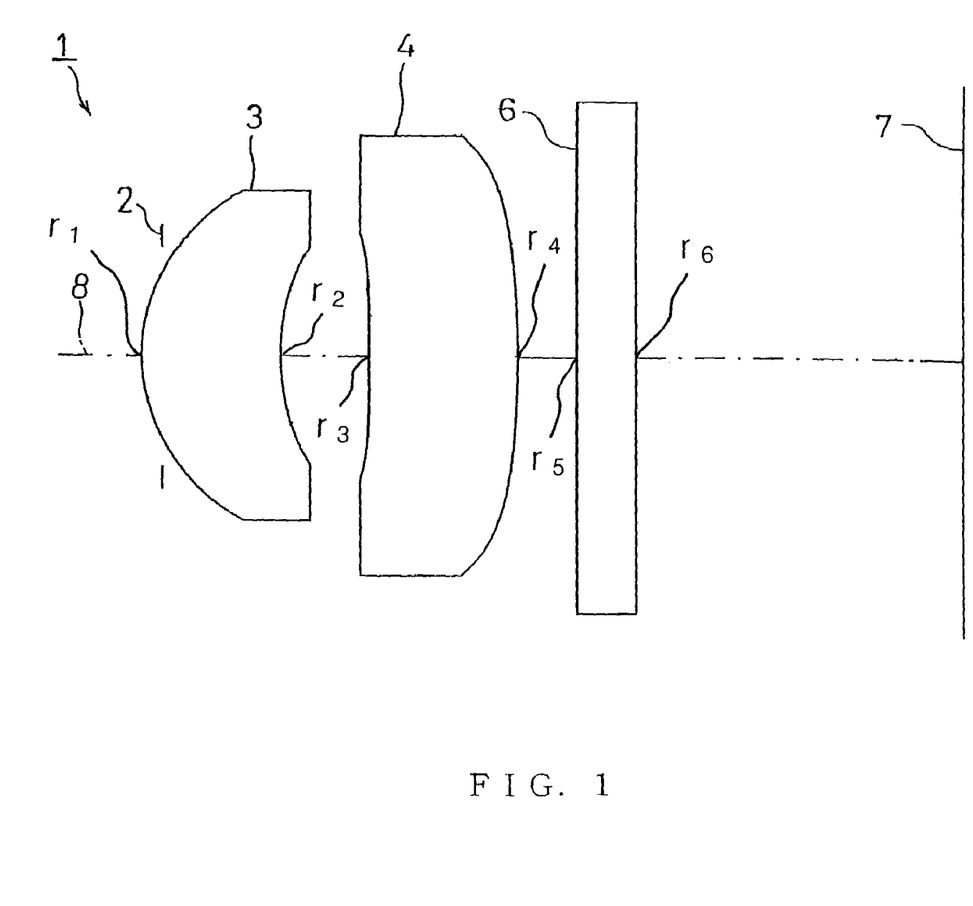
FIG. 1 is a schematic diagram for showing an embodiment of an imaging lens system according to the present invention.

As shown in FIG. 1, an imaging lens system 1 of the embodiment comprises, in order from the object side towards the image surface side, a diaphragm 2, a resin-type first lens 3 which is a meniscus lens having a positive power with its convex surface facing the object side, and a resin-type second lens 4 which is a lens having a positive power with its convex surface facing the image surface side.

In the followings, each of the lens surfaces of the first lens 3 and the second lens 4 on the object side is referred to as a first face thereof, and each lens surface on the image surface side is referred to as a second face thereof, respectively.

On the second face side of the second lens 4, various filters 6 such as a cover glass, an IR cut filter, and a lowpass filter, and an image surface 7 which is a light-receiving surface of an image pickup element such as a CCD or a CMOS are disposed, respectively. The various filters 6 may be omitted as appropriate.

As the position of the diaphragm 2 gets closer to the image surface side, the position of exit pupil comes closer to the image surface side. Thus, it becomes difficult to maintain the telecentricity, and abaxial light rays emitted from the imaging lens system 1 makes incidence obliquely to the sensor of the solid image sensor element.

In the meantime, with the embodiment, it is possible to set the position of the exit pupil far from the sensor surface (image taking surface) of the solid image sensor element by disposing the diaphragm 2 closest to the object side.

Thereby, with the embodiment, it becomes possible to maintain the high telecentricity, and the incident angle of the light rays against the sensor of the solid image sensor element can be modified.

Further, in the embodiment, the diaphragm 2 is disposed on the object side of the first lens 3 and the first lens 3 is formed in a meniscus shape with its convex surface facing the object side. Thereby, it becomes possible to effectively utilize the second face of the first lens 3.

That is, by making the angle of the abaxial light ray acute with respect to a normal line of the second face of the first lens 3 in a direction away from an optical axis 8, the refractive power (correcting effect) of the second face of the first lens 3 can be increased.

Thereby, each aberration (especially, comma aberration and chromatic aberration) generated off the axis can be effectively corrected.

On the contrary, if the shape of the second face of the first lens 3 is protruded towards the image surface side, or the diaphragm 2 is disposed on the image surface side than the first lens 3, it is not possible to increase the refractive power of the second face of the first lens 3. Thus, the above-described effect of correcting each aberration generated off axis is extremely limited.

It is further effective to form the second face of the first lens 3 to be aspherical face from a point of view that it increases the effect of correcting each aberration generated off the axis. Furthermore, in this case, it is desirable to form the second face of the first lens 3 to be the aspherical surface whose curvature increases as going away from the optical axis 8. With this, the angle of the abaxial light ray can be made more acute with respect to the normal line of the second face of the first lens 3 in the direction away from the optical axis 8. Thus, the above-described effect of correcting each aberration generated off the axis can be more effectively increased.

Further, in the embodiment, the shape of the second face of the second lens 4 is protruded towards the image surface side. Thus, higher telecentricity can be maintained and the incident angle of the light ray with respect to the sensor of the solid image sensor element can be more effectively controlled. In addition, it is preferable to form the second face of the second lens 4 to be the aspherical face whose curvature increases as going away from the optical axis 8. With this, still higher telecentricity can be maintained and the incident angle of the light ray with respect to the sensor of the solid image sensor element can be more effectively controlled.

Furthermore, in the embodiment, the imaging lens system 1 is to satisfy conditions expressed by each of the following expressions (1)–(7);

$$1.25 \geq L/fl \geq 0.8 \qquad (1)$$

$$0.55 \geq f_1/f_2 \geq 0.2 \qquad (2)$$

$$1.8 \geq f_1/fl \geq 1 \qquad (3)$$

$$4 \geq f_2/fl \geq 1.5 \qquad (4)$$

$$1 \geq d_2/d_1 \geq 0.5 \qquad (5)$$

$$0.27 \geq d_1/fl \geq 0.1 \qquad (6)$$

$$0.27 \geq d_3/fl \geq 0.1 \qquad (7)$$

where, L in the expression (1) is the entire length of the lens system, i.e. the optical distance from the surface which is physically closest to the object side to the image taking surface. More specifically, when the first face of the first lens 3 in the vicinity of the optical axis 8 is positioned closer to the image surface side than the diaphragm 2, the distance form the diaphragm 2 to the image taking surface is L. In the meantime, as described above, when the first face of the first lens 3 in the vicinity of the optical axis 8 is positioned close to the object side than the diaphragm 2 through the diaphragm 2, the distance from the first face of the first lens 3 (not the diaphragm 2) to the image taking surface is L. Further, fl in the expressions (1), (3), (6) and (7) is the focal distance of the entire lens system. Furthermore, $f_1$ in the expressions (2) and (3) is the focal distance of the first lens 3, and $f_2$ in the expressions (2) and (4) is the focal distance of the second lens 4. Moreover, $d_1$ in the expressions (5) and (6) is the center thickness of the first lens 3, $d_2$ in the expression (5) is the distance between the first lens 3 and the second lens 4 on the optical axis 8, and $d_3$ in the expression (7) is the center thickness of the second lens 4.

When the value of the L/fl exceeds the value (1.25) shown in the expression (1), the entire optical system becomes large-scaled against the demand for reducing the size and weight. In the meantime, when the value of L becomes below the value (0.8) shown in the expression (1), the entire optical system is down-sized. Thus, the productivity is deteriorated and it becomes difficult to maintain the optical performance.

Accordingly, with the embodiment, it becomes possible to sufficiently reduce the size and weight of the entire optical system while maintaining the necessary back focus distance through setting the value of L/fl to satisfy the expression (1). Furthermore, it enables to maintain an excellent optical performance and to improve the productivity as well.

It is more preferable that the relationship between L and fl satisfy an expression $1.15 \geq L/fl \geq 0.95$.

Further, when the value of $f_1/f_2$ exceeds the value (0.55) shown in the expression (2), the power of the second lens 4 becomes too strong so that the productivity is deteriorated. In addition, the back focus becomes too long so that reduction of the size and weight becomes difficult. In the meantime, when the value of $f_1/f_2$ becomes below the value (0.2) shown in the expression (2), the productivity of the first lens 3 is deteriorated and it becomes difficult to maintain the necessary back focus distance.

Accordingly, with the embodiment, it enables to further improve the productivity by setting the value of $f_1/f_2$ to satisfy the expression (2). In addition, it enables to further reduce the size and weight of the entire optical system while more effectively maintaining the necessary back focus distance.

It is more preferable that the relationship between $f_1$ and $f_2$ satisfy an expression $0.5 \geq f_1/f_2 \geq 0.3$.

Furthermore, when the value of $f_1/fl$ exceeds the value (1.8) shown in the expression (3), the back focus distance becomes too long so that reduction of the size and weight becomes difficult. In the meantime, when the value of $f_1/fl$ becomes below the value (1.0) shown in the expression (3), the productivity of the first lens is deteriorated.

Accordingly, with the embodiment, it becomes possible to further reduce the size and weight and to improve the productivity by setting the value of $f_1/fl$ to satisfy the expression (3).

It is more preferable that the relation between $f_1$ and fl satisfy an expression $1.4 \geq f_1/fl \geq 1.1$.

Moreover, when the value of $f_2/fl$ exceeds the value (4.0) shown in the expression (4), the productivity of the first lens 3 is deteriorated. In addition, it becomes difficult to maintain the necessary back focus distance. In the meantime, when the value of $f_2/fl$ becomes below the value (1.5) shown in the expression (4), the power of the second lens 4 becomes too strong so that the productivity is deteriorated.

Accordingly, with the embodiment, it enables to improve the productivity while further maintaining the necessary back focus distance to be appropriate by setting the value of $f_2/fl$ to satisfy the expression (4).

It is more preferable that the relation between $f_2$ and fl satisfy an expression $4 \geq f_2/fl \geq 2.5$.

Further, when the value of $d_2/d_1$ exceeds the value (1.0) shown in the expression (5), it becomes necessary to increase the power of the first lens 3 and the second lens 4. Thus, it becomes difficult to manufacture each of the lenses 3 and 4. Also, the height of light rays passing through the surface of the second lens 4 on the image surface side becomes high. Therefore, the power of the aspherical face is increased so that manufacture of the lenses becomes more difficult. In the meantime, when the value of $d_2/d_1$ becomes below the value (0.5) shown in the expression (5), the center thickness of the first lens 3 is relatively thickened. Therefore, it becomes difficult to maintain the back focus distance and also to insert a diaphragm which effectively limits the light amount.

Accordingly, with the embodiment, it enables to further improve the productivity by setting the value of $d_2/d_1$ to satisfy the expression (5). In addition, it becomes possible to further maintain the necessary back focus distance to be appropriate and also to maintain the optical performance to be more excellent.

It is more preferable that the relation between $d_2$ and $d_1$ satisfy an expression $0.9 \geq d_2/d_1 \geq 0.5$.

Furthermore, when the value of $d_1/fl$ exceeds the value (0.27) shown in the expression (6), the entire length of the optical system becomes too long. Thus, reduction of the size and weight becomes difficult. In the meantime, when the value of $d_1/fl$ becomes below the value (0.1) shown in the expression (6), manufacture of the first lens 3 becomes difficult.

Accordingly, with the embodiment, it enables to further reduce the size and weight and to improve the productivity by setting the value of $d_1/fl$ to satisfy the expression (6).

It is more preferable that the relation between $d_1$ and fl satisfy an expression $0.25 \geq d_1/fl \geq 0.15$.

Moreover, when the value of $d_3/fl$ exceeds the value (0.27) shown in the expression (7), the entire length of the optical system becomes too long. Thus, reduction of the size and weight becomes difficult. In the meantime, when the value of $d_3/fl$ becomes below the value (0.1) shown in the expression (6), manufacture of the second lens 4 becomes difficult.

Accordingly, with the embodiment, it enables to further reduce the size and weight of the entire optical system by setting the value of $d_3/fl$ to satisfy the expression (7). In addition, it enables to further improve the productivity.

It is more preferable that the relation between $d_3$ and fl satisfy an expression $0.25 \geq d_3/fl \geq 0.15$.

In addition to the above-described structure, it is further desirable to form the second lens 4 as a meniscus lens.

With this, it becomes possible to improve the optical performance of the periphery without imposing a burden on the shapes of the first lens 3 and the second lens 4. Also, it enables to more effectively utilize the light rays which make incidence to the periphery of the solid image sensor element.

Furthermore, as the first face of the second lens 4, it is also desirable to be formed as a convex surface in which a part close to the optical axis protrudes towards the object side and also to be formed as an aspherical face with an inflection point.

The inflection point of the first face of the second lens 4 is, on a cross section of the second lens 4 which is cut at a cross section including the optical axis 8, a point at which a tangent in touch with a curve (a curve on the cross section) of the first face of the second lens 4 changes a sign of the slope thereof.

Thus, as described above, in the case of the convex surface where the center part of the first face of the second lens 4 is facing the object side, the peripheral part surrounding the center part of the first face is to change its surface shape as a concave surface towards the object side at the inflection point as a boundary.

With this, it enables to further improve the optical performance of the periphery without further imposing a burden on each shape of the lenses 3 and 4, so that the light rays passing through each of the lenses 3 and 4 can be more effectively utilized.

The first face of the second lens 4 may be formed to have a plurality of inflection points in order from the optical axis 8 towards the periphery side. In this case, it enables to correct each aberration more excellently.

Furthermore, in addition to the above-described structure, the outer end part of the effective diameter of the first face of the second lens 4 is desirable to be positioned at a point closer to the object side than a point on the optical axis 8 of the first face of the second lens.

Thereby, the optical performance in the periphery can be more improved. Further, it is not only advantageous at the time handling the lens but also advantageous at the time of assembling for making a unit by mounting the lens to a barrel.

In addition to the above-described structure, the diaphragm 2 is desirable to satisfy the condition expressed by the following expression (8).

S in the expression (8) is the distance between the diaphragm 2 on the optical axis 8 and the optical surface closest to the object side, i.e. the distance between the diaphragm 2 on the optical axis 8 and the first face of the first lens 3. Also, S is a physical distance, and the diaphragm 2 may be either on the object side or the image surface side with respect to the point on the optical axis 8 of the first face of the first lens 3.

$$0.2 \geq S \qquad (8)$$

With this, in addition, the telecentricity can be more effectively maintained and more reduction of the size and weight can be achieved.

S is more preferable to satisfy an expression $0.15 \geq S$.

Furthermore, in addition to the above-described structure, it is desirable to satisfy the condition expressed by the following expression (9).

Bfl in the expression (9) is the back focus distance, i.e. the distance (air reduced length) on the optical axis 8 from the lens end face (the second face of the second lens 4) to the image taking surface 7.

$$0.8 \geq Bfl/fl \geq 0.4 \qquad (9)$$

With this, reduction of the size and weight can be more effectively achieved. Also, productivity is more improved and it can be more easily handled at the time of assembling.

It is more preferable that the relationship between Bfl and fl satisfy an expression $0.6 \geq Bfl/fl \geq 0.45$.

Furthermore, in addition to the above-described structure, it is desirable to satisfy the condition expressed by the following expression (10).

$$2.5 \geq Bfl \geq 1.2 \qquad (10)$$

With this, reduction of the size and weight can be more effectively achieved. Also, productivity is more improved and it can be more easily handled at the time of assembling.

Bfl is more preferable to satisfy an expression $2.5 \geq Bfl \geq 1.5$.

Furthermore, in addition to the above-described structure, it is desirable to satisfy the condition expressed by the following expression (11).

In the expression (11), $r_4$ is the radius curvature of the second face of the second lens 4.

$$-0.5 \geq r_4/fl \geq -6.0 \qquad (11)$$

With this, processing of the optical surface can be more easily performed and each aberration in the periphery can be more excellently corrected.

It is more preferable that the relationship between $r_4$ and fl satisfy an expression $-1.0 \geq r_4/fl \geq -2.0$.

Further, in addition to the above-described structure, fl is desirable to satisfy an expression $5.0 \geq fl \geq 2.0$ (more preferably, $5.0 \geq fl \geq 3.0$).

Thereby, it becomes a structure which is more preferable as a lens for a camera module to be mounted on a portable terminal and the like.

Furthermore, a resin material for molding the first lens 3 and the second lens 4 may have any composition as long as it is a material with transparency to be used for molding optical components, e.g., acryl, polycarbonate, amorphous polyolefin resin, etc. However, in order to further improve the manufacturing efficiency and more reduction of manufacturing cost, it is desirable to use the same resin material for both lenses 3 and 4.

EXAMPLES

Next, EXAMPLES of the present invention will be described by referring to FIG. 2–FIG. 9.

In this embodiment, F No denotes F number and r denotes the curvature radius of the optical surface (the center radius curvature in the case of a lens). Further, d denotes the distance to the next optical surface. Furthermore, nd denotes the index of refraction when the d line (yellow) is irradiated, and νd denotes the Abbe number also when the d line is irradiated.

k, A, B, C and D denote each coefficient in a following expression (12). That is, the shape of the aspherical surface is expressed by the following expression provided that the direction of the optical axis 8 is taken as the Z axis, the direction orthogonal to the optical axis 8 is the X axis, the traveling direction of light is positive, k is the constant of cone, A, B, C, D are the aspherical coefficients, and r is the curvature radius.

$$Z(X)=r^{-1}X^2/[1+\{1-(k+1)r^{-2}X^2\}^{1/2}]+AX^4+BX^6+CX^8+DX^{10} \qquad (12)$$

FIRST EXAMPLE

Figure 2:
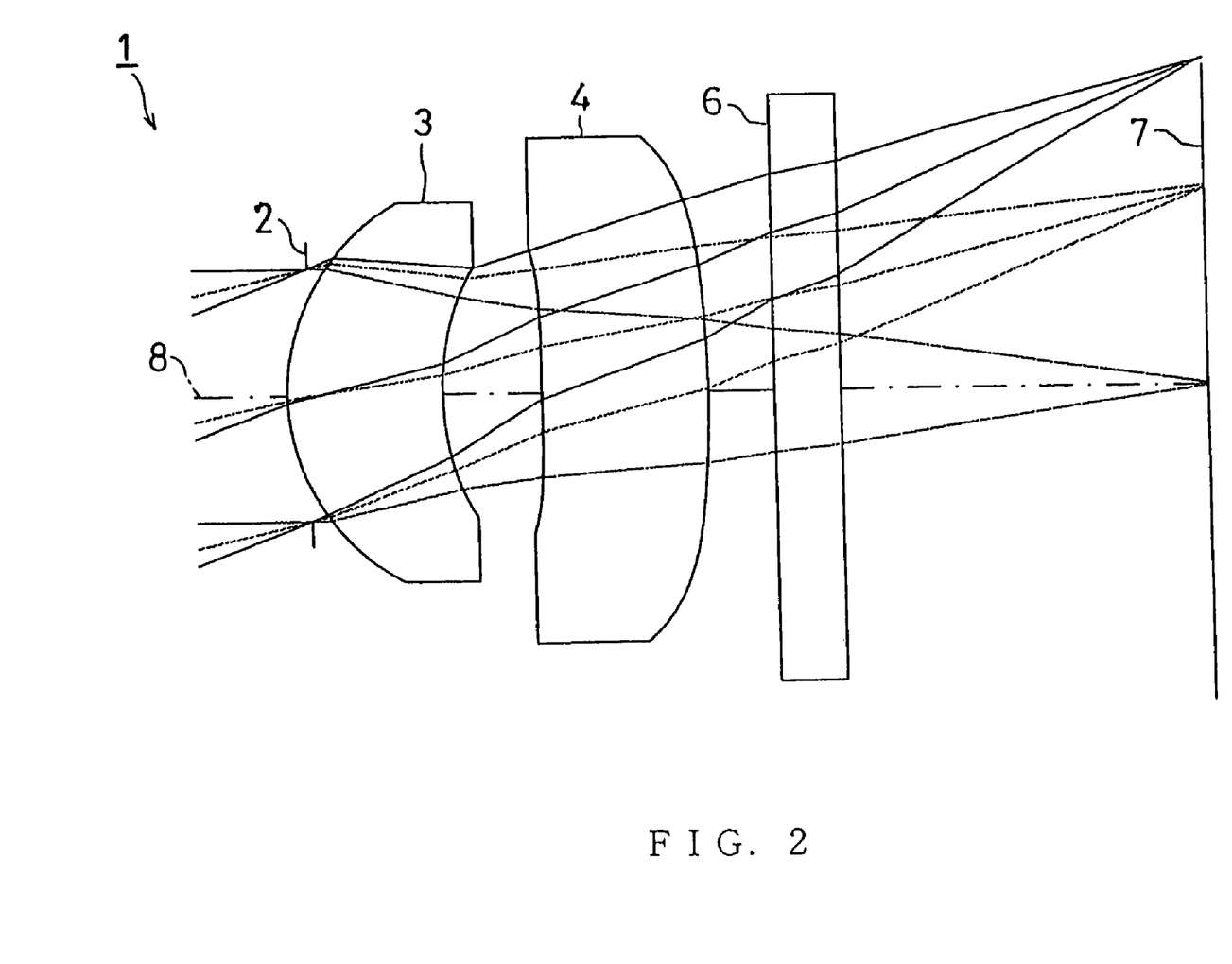
FIG. 2 is a schematic diagram for showing FIRST EXAMPLE of the imaging lens system according to the present invention.

FIG. 2 shows FIRST EXAMPLE of the present invention. In FIRST EXAMPLE, like the imaging lens system 1 shown in FIG. 1, a diaphragm 2 was disposed on the object side of the first face of the first lens 3, and a cover glass as a filter 6 is disposed between the second face of the second lens 4 and an image taking surface 7. The first face of the first lens 3 is disposed at a position closer to the object side than the diaphragm 2 through the diaphragm 2.

The imaging lens system 1 of FIRST EXAMPLE was set under the following condition.

Lens Data

L=4.04 mm, fl=3.82 mm, $f_1$=4.52 mm, $f_2$=13.28 mm, $d_1$=0.70 mm, $d_2$=0.45 mm, $d_3$=0.75 mm, $r_4$=−6.029 mm, F no=3.5

| Face Number | r | d | nd | νd |
|---|---|---|---|---|
| (Object Point) | | | | |
| 1 (First Face of First Lens) | 1.033 | 0.700 | 1.531 | 56.0 |
| 2 (Second Face of First Lens) | 1.387 | 0.200 | | |
| 3 (First Face of Second Lens) | −39.796 | 0.750 | 1.531 | 56.0 |
| 4 (Second Face of Second Lens) | −6.029 | 0.300 | | |
| 5 (First Face of Cover Glass) | 0.000 | 0.300 | 1.516 | 64.0 |
| 6 (Second Face of Cover Glass) (Image surface) | 0.000 | | | |

Diaphragm 2 was disposed at a position 0.1 mm towards the image surface side from the point on the optical axis 8 of the first face of the first lens 3.

| Face Number | k | A | B | C | D |
|---|---|---|---|---|---|
| 1 | −1.14E−1 | 7.57E−3 | 7.43E−2 | −1.04E−1 | 1.87E−1 |
| 2 | 2.39E | −6.17E−3 | −1.40E−1 | 4.13E−1 | 6.23E−2 |
| 3 | −7.95E+3 | −1.60E−1 | 4.08E−2 | −4.48E−1 | 0 |
| 4 | −1.60E+2 | −9.31E−2 | 3.36E−2 | −4.93E−2 | 2.84E−3 |

Under such condition, L/fl=1.06 was achieved, thereby satisfying the expression (1), and $f_1/f_2$=0.34 was achieved, thereby satisfying the expression (2). Further, $f_1$/fl=1.18 was achieved, thereby satisfying the expression (3), and $f_2$/fl=3.48 was achieved, thereby satisfying the expression (4). Furthermore, $d_2/d_1$=0.64 was achieved, thereby satisfying the expression (5), and $d_1$/fl=0.18 was achieved, thereby satisfying the expression (6). Also, $d_3$/fl=0.20 was achieved, thereby satisfying the expression (7). Further, S=0.10 mm was achieved, thereby satisfying the expression (8), and Bfl/fl=0.56 was achieved, thereby satisfying the expression (9). Moreover, Bfl=2.14 mm was achieved, thereby satisfying the expression (10), and $r_4$/fl=−1.58 was achieved, thereby satisfying the expression (11).

Figure 3:
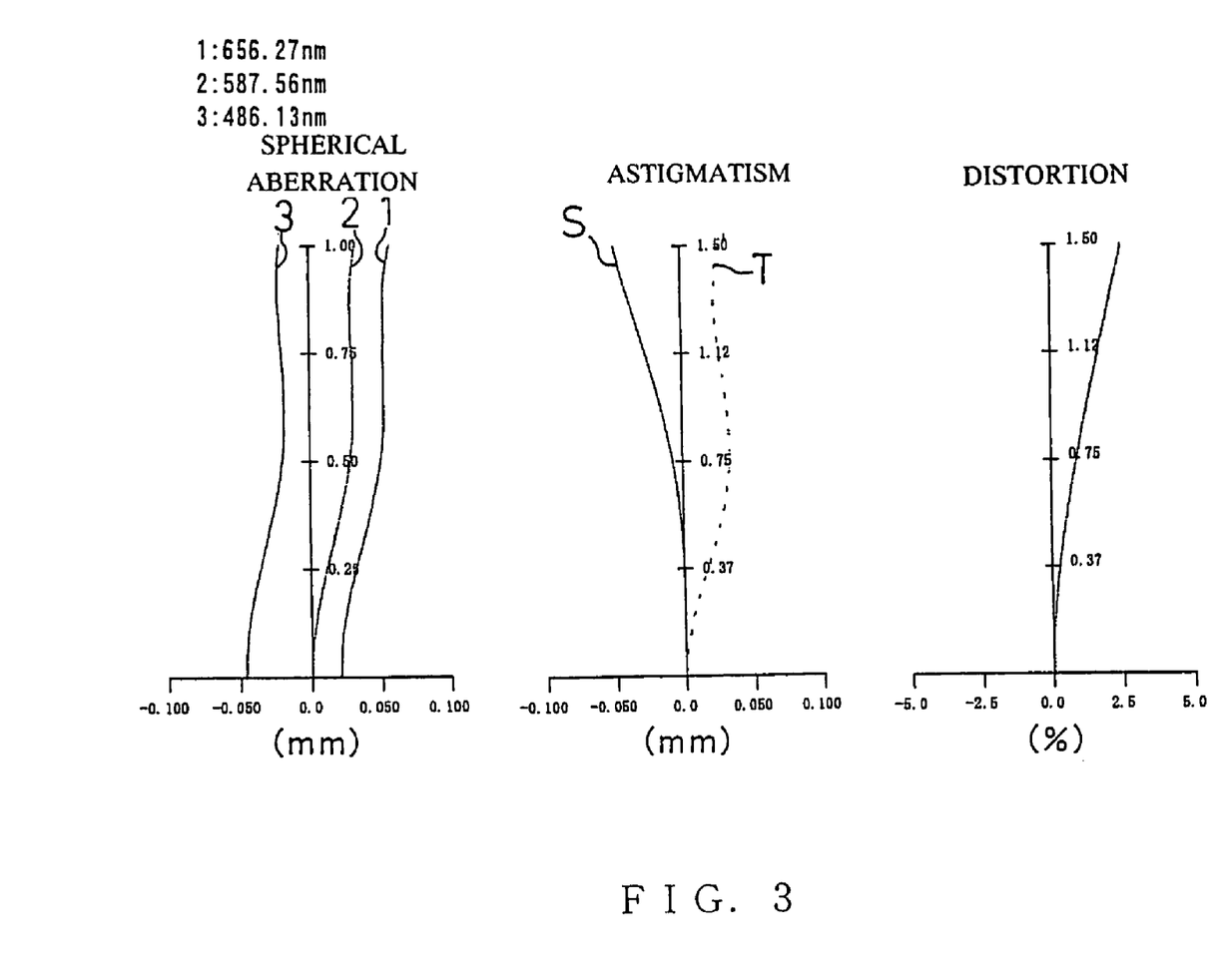
FIG. 3 show graphs for describing the spherical aberration, astigmatism, and distortion of the imaging lens system shown in FIG. 2.

FIG. 3 shows the spherical aberration, astigmatism, and distortion of the imaging lens system 1 of FIRST EXAMPLE.

Each of the spherical aberration, astigmatism, and distortion was almost satisfied. According to the result, it can be seen that a sufficient optical property can be obtained.

SECOND EXAMPLE

Figure 4:
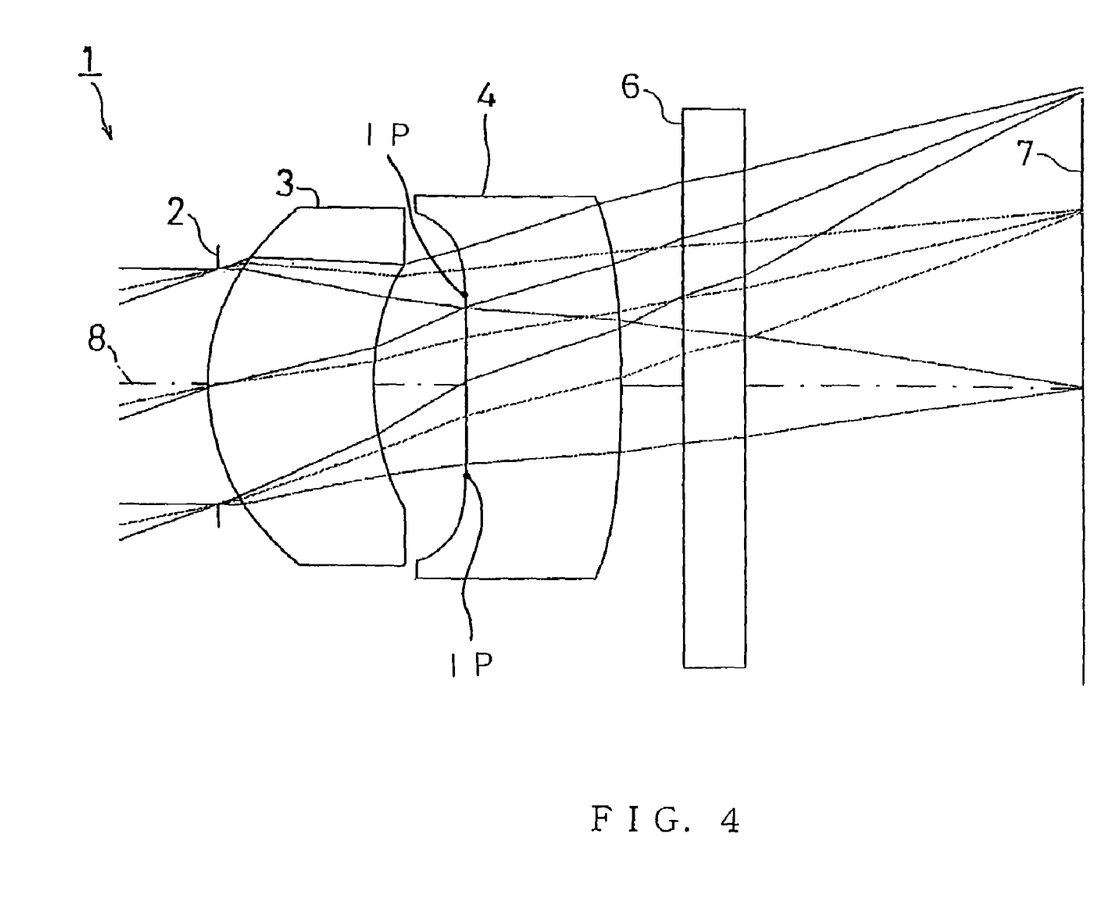
FIG. 4 is a schematic diagram for showing SECOND EXAMPLE of the imaging lens system according to the present invention.

FIG. 4 shows SECOND EXAMPLE of the present invention. In SECOND EXAMPLE, like the imaging lens system 1 shown in FIG. 1, a diaphragm 2 was disposed on the object side of the first face of the first lens 3, and a cover glass as a filter 6 is disposed between the second face of the second lens 4 and the image taking surface 7. The first face of the first lens 3 is disposed at a position closer to the object side than the diaphragm 2 through the diaphragm 2.

The imaging lens system 1 of SECOND EXAMPLE was set under the following condition.

Lens Data

L=4.12 mm, fl=3.82 mm, $f_1$=4.85 mm, $f_2$=10.06 mm, $d_1$=0.80 mm, $d_2$=0.45 mm, $d_3$=0.75 mm, $r_4$=−5.472 mm, F no=3.2

| Face Number | r | d | nd | νd |
|---|---|---|---|---|
| (Object Point) | | | | |
| 1 (First Face of First Lens) | 1.115 | 0.800 | 1.531 | 56.0 |
| 2 (Second Face of First Lens) | 1.478 | 0.250 | | |
| 3 (First Face of Second Lens) | 217.325 | 0.750 | 1.531 | 56.0 |
| 4 (Second Face of Second Lens) | −5.472 | 0.300 | | |
| 5 (First Face of Cover Glass) | 0.000 | 0.300 | 1.516 | 64.0 |
| 6 (Second Face of Cover Glass) (Image surface) | 0.000 | | | |

Diaphragm 2 was disposed at a position 0.05 mm towards the object side from the point on the optical axis 8 of the first face of the first lens 3.

| Face Number | k | A | B | C | D |
|---|---|---|---|---|---|
| 1 | 8.42E−2 | −2.13E−2 | 6.78E−3 | 7.52E−2 | −1.24E−1 |
| 2 | −1.66E | 1.47E−1 | 1.23E−2 | −6.11E−2 | 7.47E−1 |
| 3 | 0 | 1.24E−2 | −8.16E−1 | 1.77E | −1.92E |
| 4 | −7.50E | 3.21E−2 | −1.82E−1 | 1.48E−1 | −6.76E−2 |

Under such condition, L/fl=1.08 was achieved, thereby satisfying the expression (1), and $f_1/f_2$=0.48 was achieved, thereby satisfying the expression (2). Further, $f_1$/fl=1.27 was achieved, thereby satisfying the expression (3), and $f_2$/fl=2.63 was achieved, thereby satisfying the expression (4). Furthermore, $d_2/d_1$=0.56 was achieved, thereby satisfying the expression (5), and $d_1$/fl=0.21 was achieved, thereby satisfying the expression (6). Also, $d_3$/fl=0.20 was achieved, thereby satisfying the expression (7). Further, S=0.05 mm was achieved, thereby satisfying the expression (8), and Bfl/fl=0.55 was achieved, thereby satisfying the expression (9). Moreover, Bfl=2.12 mm was achieved, thereby satisfying the expression (10), and $r_4/fl-1.43$ was achieved, thereby satisfying the expression (11).

Figure 5:
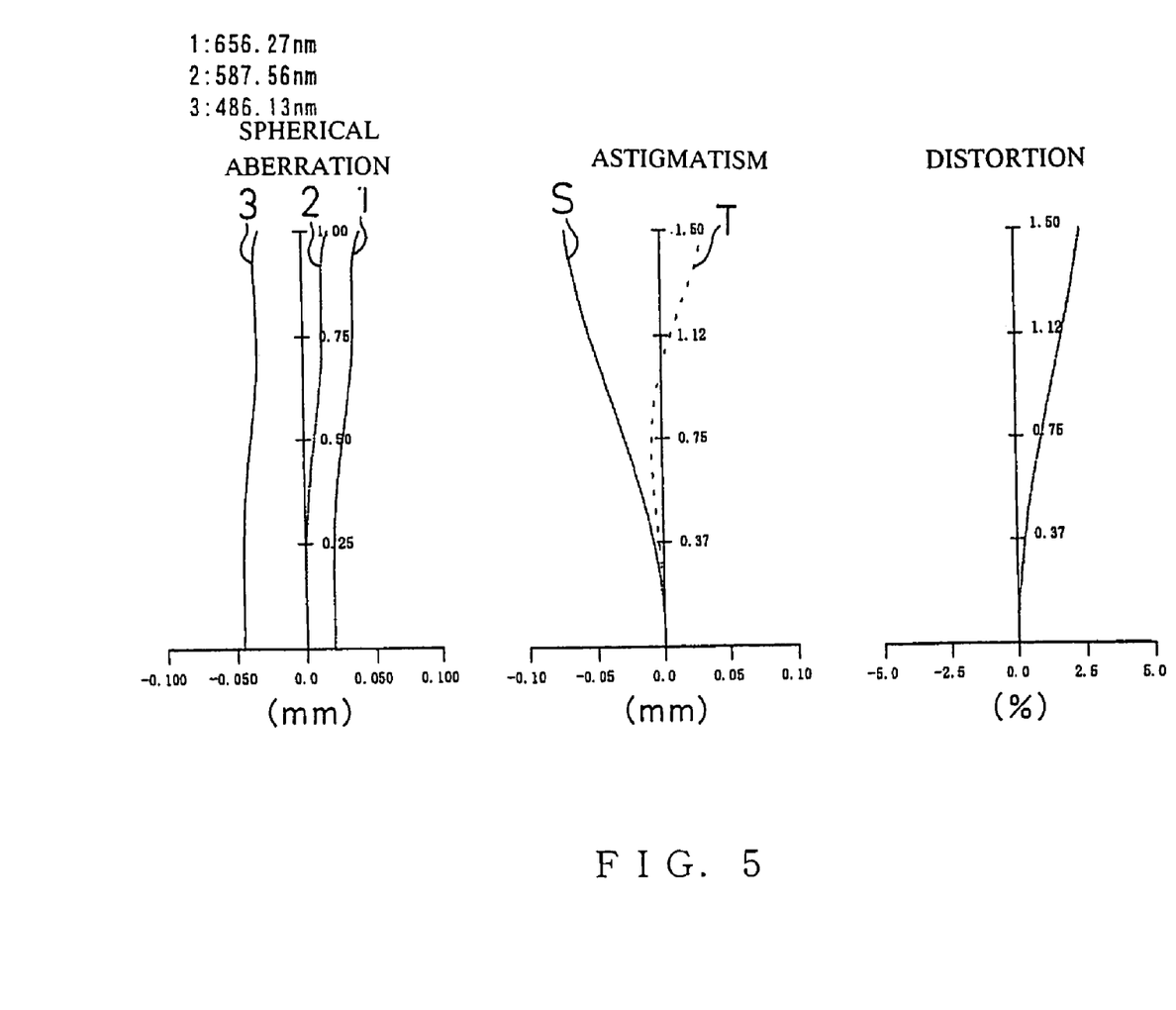
FIG. 5 show graphs for describing the spherical aberration, astigmatism, and distortion of the imaging lens system shown in FIG. 4.

FIG. 5 shows the spherical aberration, astigmatism, and distortion of the imaging lens system 1 of SECOND EXAMPLE.

Each of the spherical aberration, astigmatism, and distortion was almost satisfied. According to the result, it can be seen that a sufficient optical property can be obtained.

THIRD EXAMPLE

Figure 6:
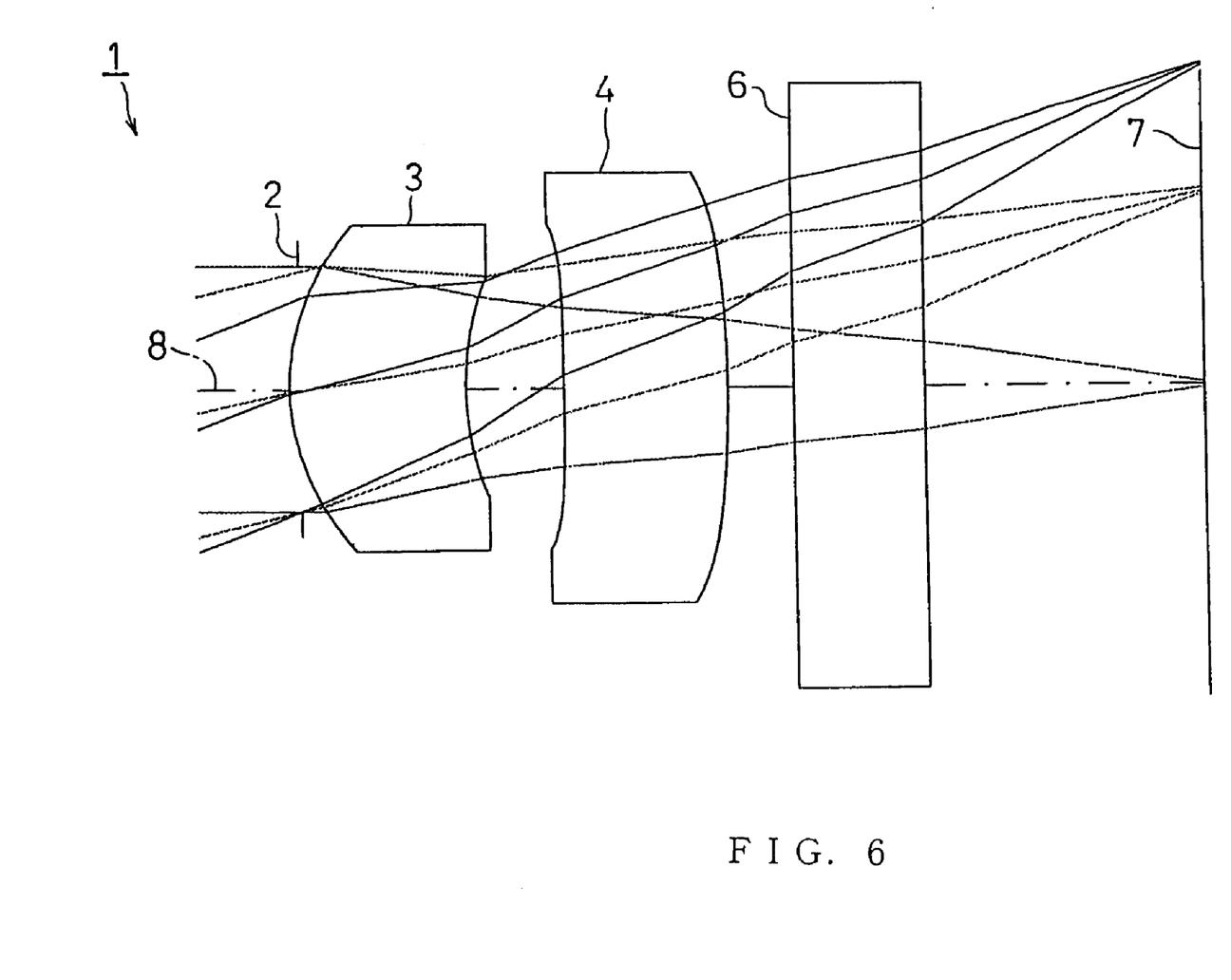
FIG. 6 is a schematic diagram for showing THIRD EXAMPLE of the imaging lens system according to the present invention.

FIG. 6 shows THIRD EXAMPLE of the present invention. In THIRD EXAMPLE, like the imaging lens system 1 shown in FIG. 1, a diaphragm 2 was disposed on the object side of the first face of the first lens 3, and a cover glass as a filter 6 is disposed between the second face of the second lens 4 and the image taking surface 7. The first face of the first lens 3 is disposed at a position closer to the object side than the diaphragm 2 through the diaphragm 2.

The imaging lens system 1 of THIRD EXAMPLE was set under the following condition.

Lens Data

L=3.96 mm, fl=3.66 mm, $f_1$=4.45 mm, $f_2$=10.68 mm, $d_1$=0.8 mm, $d_2$=0.45 mm, $d_3$=0.75 mm, $r_4$=−5.00 mm, F no=3.21

| Face Number | r | d | nd | vd |
|---|---|---|---|---|
| (Object Point) | | | | |
| 1 (First Face of First Lens) | 1.081 | 0.800 | 1.531 | 56.0 |
| 2 (Second Face of First Lens) | 1.481 | 0.450 | | |
| 3 (First Face of Second Lens) | −40.000 | 0.750 | 1.531 | 56.0 |
| 4 (Second Face of Second Lens) | −5.000 | 0.300 | | |
| 5 (First Face of Cover Glass) | 0.000 | 0.600 | 1.516 | 64.0 |
| 6 (Second Face of Cover Glass) (Image surface) | 0.000 | | | |

Diaphragm 2 was disposed at a position 0.05 mm towards the image surface side from the point on the optical axis 8 of the first face of the first lens 3.

| Face Number | k | A | B | C | D |
|---|---|---|---|---|---|
| 3 | −8.84E−2 | 1.33E−2 | −4.73E−2 | 4.06E−1 | −7.27E−1 |
| 4 | −9.35E−1 | 1.69E−1 | −1.65E−1 | 1.14E | −8.97E−1 |
| 5 | −8.48E+4 | −1.31E−1 | 5.33E−2 | −3.53E−1 | 0 |
| 6 | −7.12E+1 | −2.99E−2 | −9.48E−2 | 7.79E−2 | −4.36E−2 |

Under such condition, L/fl=1.08 was achieved, thereby satisfying the expression (1), and $f_1/f_2$=0.42 was achieved, thereby satisfying the expression (2). Further, $f_1/fl$=1.22 was achieved, thereby satisfying the expression (3), and $f_2/fl$=2.92 was achieved, thereby satisfying the expression (4). Furthermore, $d_2/d_1$=0.56 was achieved, thereby satisfying the expression (5), and $d_1/fl$=0.22 was achieved, thereby satisfying the expression (6). Also, $d_3/fl$=0.20 was achieved, thereby satisfying the expression (7). Further, S=0.05 mm was achieved, thereby satisfying the expression (8), and Bfl/fl=0.54 was achieved, thereby satisfying the expression (9). Moreover, Bfl=1.96 mm was achieved, thereby satisfying the expression (10), and $r_4/fl$=−1.37 was achieved, thereby satisfying the expression (11).

Figure 7:
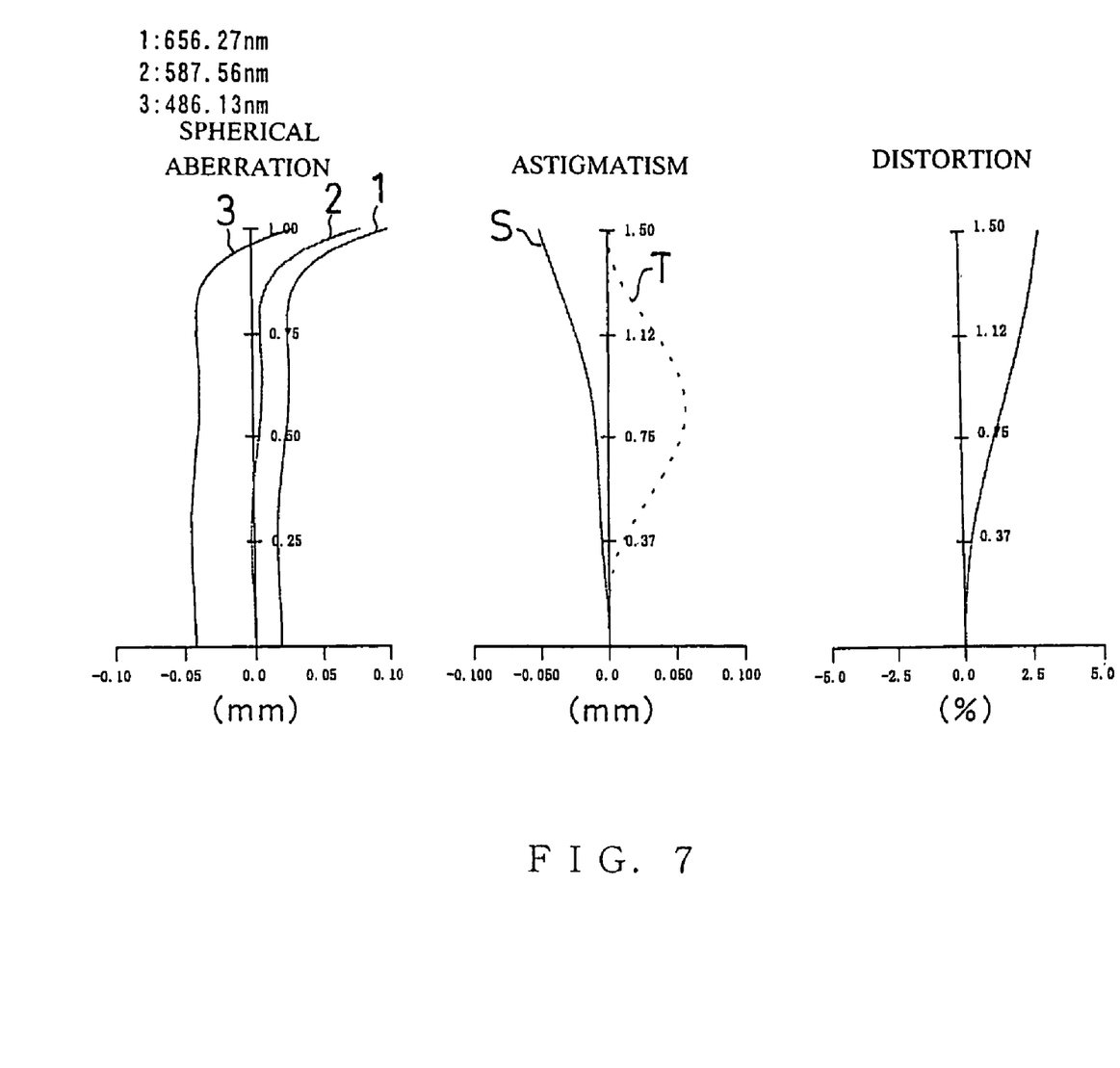
FIG. 7 show graphs for describing the spherical aberration, astigmatism, and distortion of the imaging lens system shown in FIG. 6.

FIG. 7 shows the spherical aberration, astigmatism, and distortion of the imaging lens system 1 of THIRD EXAMPLE.

Each of the spherical aberration, astigmatism, and distortion was almost satisfied. According to the result, it can be seen that a sufficient optical property can be obtained.

FOURTH EXAMPLE

Figure 8:
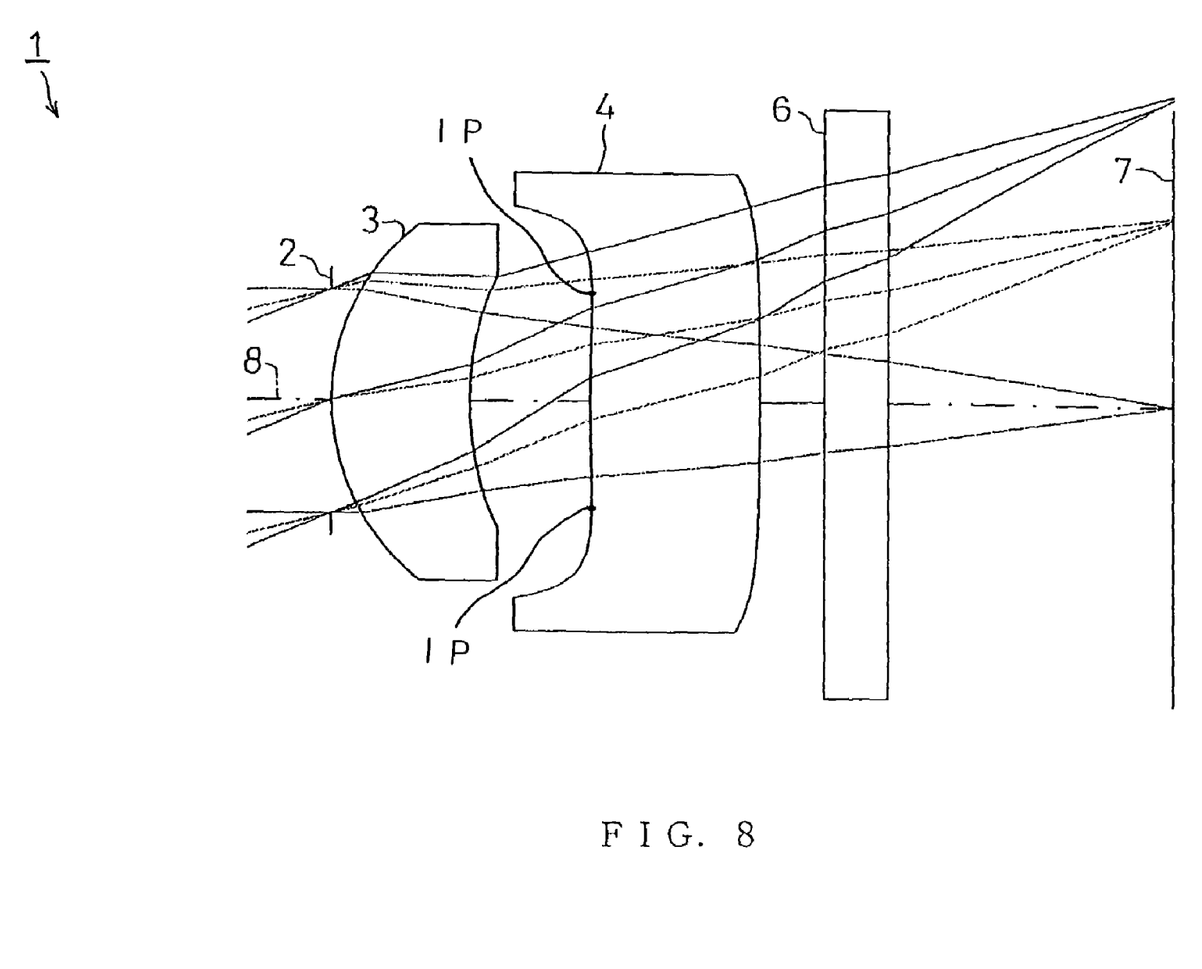
FIG. 8 is a schematic diagram for showing FOURTH EXAMPLE of the imaging lens system according to the present invention.

FIG. 8 shows FOURTH EXAMPLE of the present invention. In FOURTH EXAMPLE, like the imaging lens system 1 shown in FIG. 1, a diaphragm 2 was disposed on the object side of the first face of the first lens 3, and a cover glass as a filter 6 is disposed between the second face of the second lens 4 and the image taking surface 7. The first face of the first lens 3 is disposed at a position closer to the object side than the diaphragm 2 through the diaphragm 2.

The imaging lens system 1 of FOURTH EXAMPLE was set under the following condition.

Lens Data

L=3.81 mm, fl=3.46 mm, $f_1$=4.37 mm, $f_2$=10.44 mm, $d_1$=0.646 mm, $d_2$=0.562 $d_3$=0.792 mm, $r_4$=−17.929 mm, F no=3.2

| Face Number | r | d | nd | vd |
|---|---|---|---|---|
| (Object Point) | | | | |
| 1 (First Face of First Lens) | 1.087 | 0.646 | 1.531 | 56.0 |
| 2 (Second Face of First Lens) | 1.622 | 0.250 | | |
| 3 (First Face of Second Lens) | 7.906 | 0.792 | 1.531 | 56.0 |
| 4 (Second Face of Second Lens) | −17.929 | 0.300 | | |
| 5 (First Face of Cover Glass) | 0.000 | 0.300 | 1.516 | 64.0 |
| 6 (Second Face of Cover Glass) (Image surface) | 0.000 | | | |

Diaphragm 2 was disposed at a position 0.05 mm towards the image surface side from the point on the optical axis 8 of the first face of the first lens 3.

| Face Number | k | A | B | C | D |
|---|---|---|---|---|---|
| 1 | −4.61E−1 | 4.34E−2 | −3.33E−2 | 3.71E−1 | −3.17E−1 |
| 2 | −4.03E | 1.54E−1 | 1.82E−1 | −4.96E−1 | 1.36E |
| 3 | −2.22E | −1.24E−1 | 1.81E−1 | −1.44E | 2.76E |
| 4 | 1.54E−2 | 6.27E−2 | −2.03E−1 | 1.77E−1 | −9.16E−2 |

Under such condition, L/fl=1.10 was achieved, thereby satisfying the expression (1), and $f_1/f_2$=0.42 was achieved, thereby satisfying the expression (2). Further, $f_1/fl$=1.26 was achieved, thereby satisfying the expression (3), and $f_2/fl$=3.02 was achieved, thereby satisfying the expression (4). Furthermore, $d_2/d_1$=0.87 was achieved, thereby satisfying the expression (5), and $d_1/fl$=0.19 was achieved, thereby satisfying the expression (6). Also, $d_3/fl$=0.23 was achieved, thereby satisfying the expression (7). Further, S=0.05 mm was achieved, thereby satisfying the expression (8), and Bfl/fl=0.52 was achieved, thereby satisfying the expression (9). Moreover, Bfl=1.81 mm was achieved, thereby satisfying the expression (10), and $r_4/fl$=−5.19 was achieved, thereby satisfying the expression (11).

Figure 9:
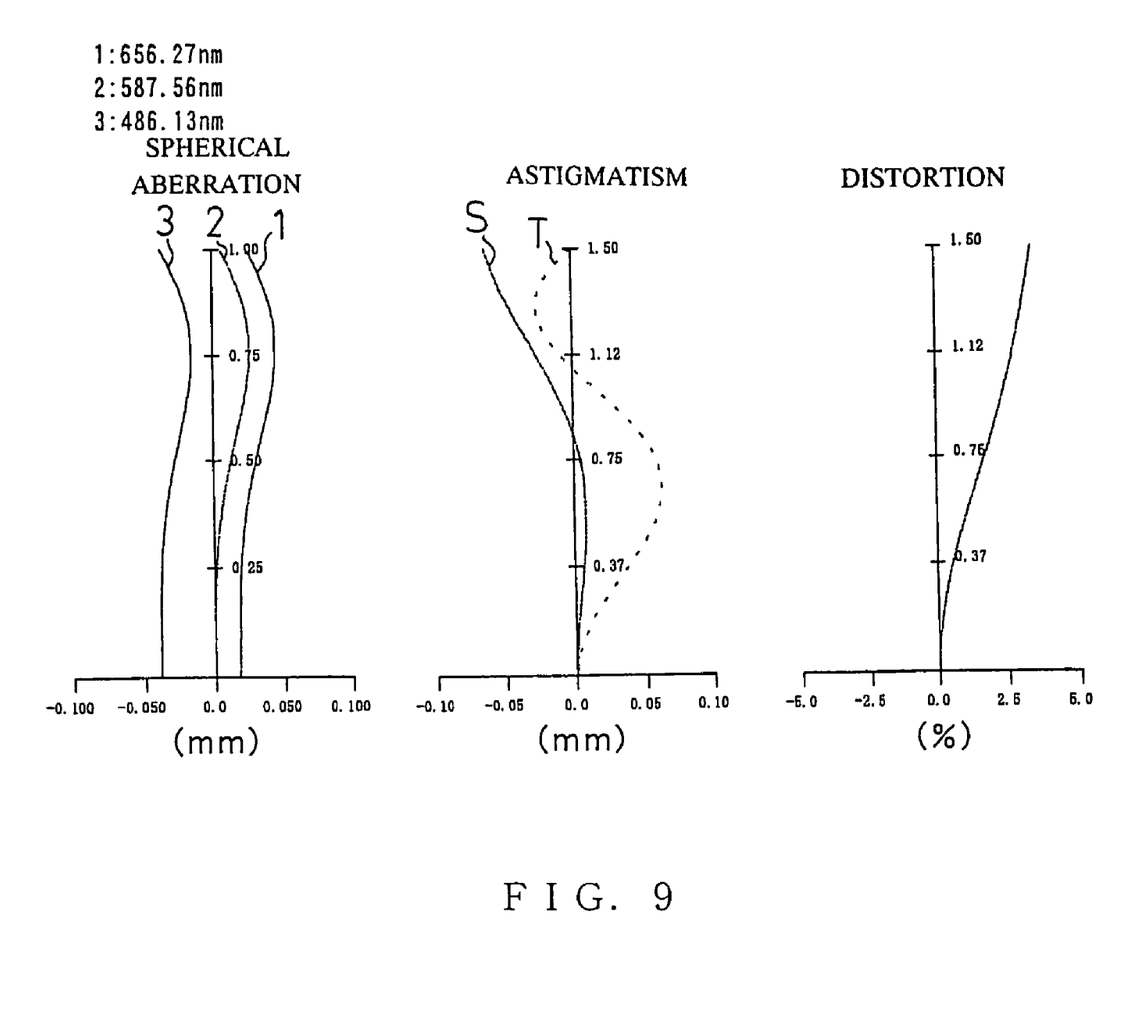
FIG. 9 show graphs for describing the spherical aberration, astigmatism, and distortion of the imaging lens system shown in FIG. 8.

FIG. 9 shows the spherical aberration, astigmatism, and distortion of the imaging lens system 1 of FOURTH EXAMPLE.

Each of the spherical aberration, astigmatism, and distortion was almost satisfied. According to the result, it can be seen that a sufficient optical property can be obtained.

The present invention is not limited to the above-described embodiment and EXAMPLES but various modifications are possible as necessary.

For example, a light amount restriction plate may be provided between the second face of the first lens 3 and the first face of the second lens 4.

What is claimed is:

1. An imaging lens system used for forming an image of an object on an image taking surface of a solid image sensor element, comprising:

in order from an object side towards an image surface side, a diaphragm, a first lens which is a meniscus lens having positive power whose convex surface facing said object side, and a second lens which is a lens having a positive power whose convex surface facing said image surface side, wherein conditions expressed by each of following expressions (1)–(7) are to be satisfied;

$$1.25 \geq L/fl \geq 0.8 \quad (1)$$

$$0.55 \geq f_1/f_2 \geq 0.2 \quad (2)$$

$$1.8 \geq f_1/fl \geq 1 \quad (3)$$

$$4 \geq f_2/fl \geq 1.5 \quad (4)$$

$$1 \geq d_2/d_1 \geq 0.5 \quad (5)$$

$$0.27 \geq d_1/fl \geq 0.1 \quad (6)$$

$$0.27 \geq d_3/fl \geq 0.1 \quad (7)$$

where,

L: entire length of said lens system
fl: focal distance of entire lens system
$f_1$: focal distance of said first lens
$f_2$: focal distance of said second lens
$d_1$: center thickness of said first lens
$d_2$: distance between said first lens and second lens on an optical axis
$d_3$: center thickness of said second lens.

2. The imaging lens system according to claim 1, wherein said second lens is formed as a meniscus lens.

3. The imaging lens system according to claim 1, wherein an object-side surface of said second lens is protruded towards said object side in an area near an optical axis and is also formed as an aspherical face with an inflection point.

4. The imaging lens system according to claim 3, wherein an outer end part of effective diameter in an object-side surface of said second lens is positioned closer to said object side than a point on the optical axis on said object-side surface of said second lens.

5. The imaging lens system according to any one of claims 1–4, wherein, further, said diaphragm satisfies a condition expressed by a following expression (8);

$$0.2 \geq S \quad (8)$$

where,

S: distance between said diaphragm on the optical axis and an optical surface closest to said object side.

6. The imaging lens system according to claim 5, wherein, further, condition expressed by a following expression (9) is to be satisfied;

$$0.8 \geq Bfl/fl \geq 0.4 \quad (9)$$

where,

Bfl: back focus distance (distance from a lens end surface to said image taking surface on said optical axis (air reduced length)).

7. The imaging lens system according to claim 6, wherein, further, condition expressed by a following expression (10) is to be satisfied $$2.5 \geq Bfl \geq 1.2 \quad (10).$$

8. The imaging lens system according to claim 7, wherein, further, condition expressed by a following expression (11) is to be satisfied;

$$-0.5 \geq r4/fl \geq -6.0 \quad (11)$$

where, $r_4$: curvature radius of a surface of said second lens on said image surface side.

* * * * *